(12) United States Patent
Leung

(10) Patent No.: US 6,490,280 B1
(45) Date of Patent: Dec. 3, 2002

(54) FRAME ASSEMBLY IN DEQUEUING BLOCK

(75) Inventor: Eric Tsin-Ho Leung, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/281,975

(22) Filed: Mar. 31, 1999

(51) Int. Cl.[7] .............................................. H04L 12/54
(52) U.S. Cl. ...................................... 370/392; 370/428
(58) Field of Search ................................ 370/389, 392, 370/395.1, 395.3, 395.31, 395.53, 465, 470, 471, 474, 428, 429

(56) References Cited

U.S. PATENT DOCUMENTS

| | | | |
|---|---|---|---|
| 5,515,376 A | 5/1996 | Murthy et al. ............ | 370/85.13 |
| 6,088,355 A | * 7/2000 | Mills et al. ................. | 370/392 |
| 6,181,699 B1 | * 1/2001 | Crinion et al. .............. | 370/389 |

* cited by examiner

Primary Examiner—Kwang Bin Yao

(57) ABSTRACT

A multiport data communication system for switching data packets between ports comprising a plurality of receive ports for receiving data packets, a memory storing the received data packets, and a plurality of transmit ports each having a transmit queue. Logic circuitry for each transmit port controls reading from memory data corresponding to each data packet to be transmitted from the respective transmit port, reassembling the data read from the memory, and writing the reassembled data to the corresponding transmit queue. A monitoring circuit monitors the received data packets prior to storing them in the memory and determines whether a respective data packet should have the VLAN tag inserted/stripped/modified and/or the Device ID inserted/stripped. Reassembling the data includes inserting/stripping/modifying a VLAN tag and/or inserting/stripping a Device ID into the data read from the memory in accordance with a result of the determination of the monitoring circuit prior to writing the reassembled data into the corresponding transmit queue.

15 Claims, 11 Drawing Sheets

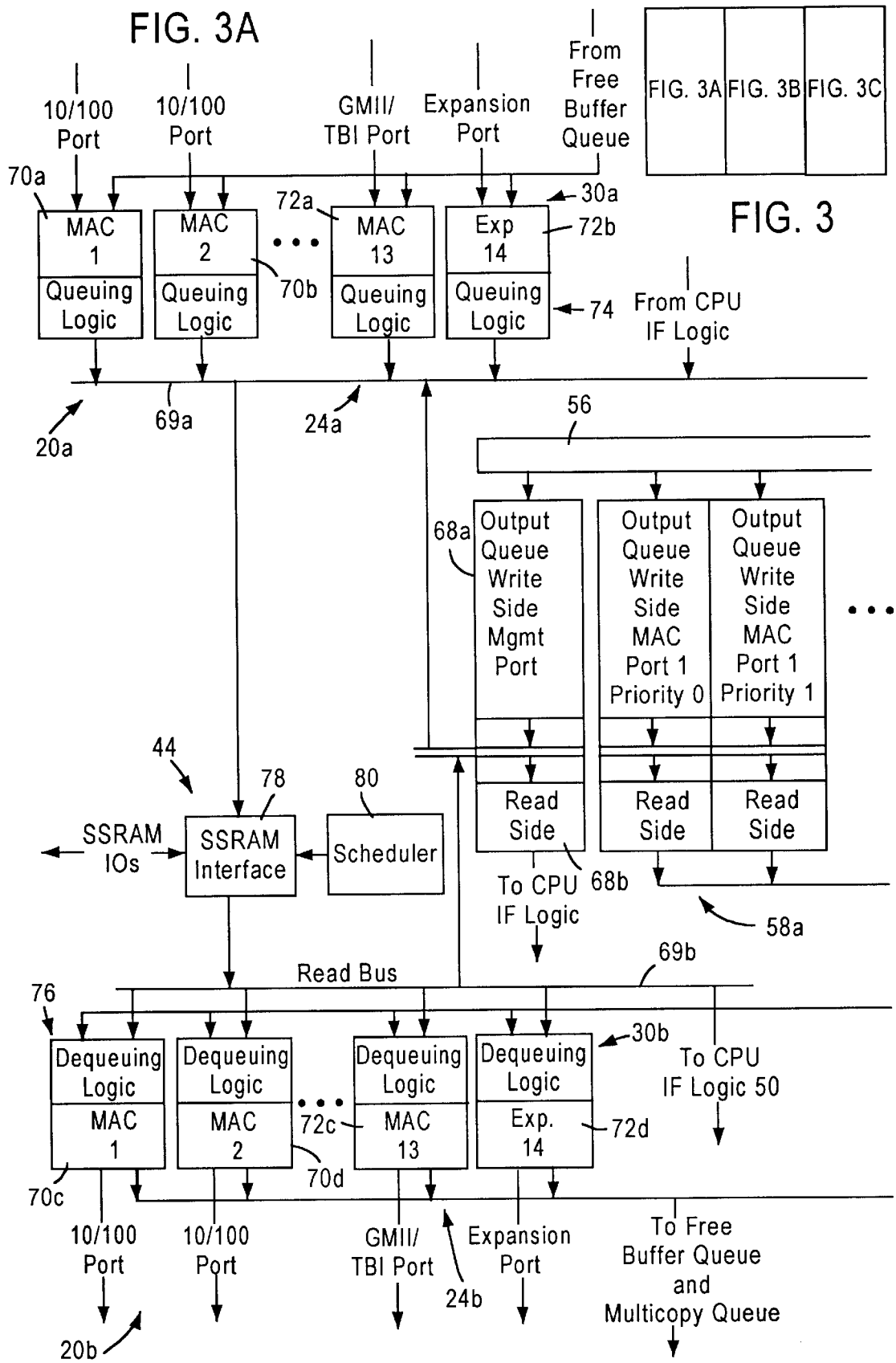

FRAME ASSEMBLY IN DEQUEUING BLOCK

FIELD OF THE INVENTION

This invention relates to data communication systems, and more particularly, to a method and mechanism for processing frame data read from a memory for transmission from various ports of a communication switch.

BACKGROUND ART

A multiport communication switch may be provided in a data communication network to enable data communication between multiple network stations connected to various ports of the switch. A logical connection may be created between receive ports and transmit ports of the switch to forward received data packets, e.g., frame data, to appropriate destinations. Based on frame headers, a frame forwarding arrangement selectively transfers received frame data (packet data) to a destination station.

Data packets received at a port of the multiport communication switch are transferred to an external memory and subsequently retrieved and placed in a transmit queue (transmit FIFO) for transmission from another port of the switch. The frame data to be transmitted from the multiport communication switch can be transferred to one or more members of a prescribed group of stations (VLAN-virtual LAN) by having the frame data include a VLAN tag header that identifies the frame information as information destined to the prescribed group of stations. In addition, it is possible for plural multiport communication switches to be cascaded together as a separate backbone network by adding a device ID tag to the frame data. When a VLAN tag or a device ID is inserted, four (4) bytes are added to the frame data read from the external memory.

Sometimes, the VLAN tag needs to be changed (modified) or totally striped from the data as a result of a decision made by a decision making engine of the multiport communication switch. While a device ID is not modifiable, it is sometimes necessary to strip the device ID from the data also as a result of a decision made by the decision making engine of the multiport communication switch. When a VLAN tag or device ID is stripped from frame data, four (4) bytes are subtracted from the frame length. Conventionally, VLAN tag insertion/stripping/modification and Device ID insertion/stripping has been accomplished in a multiport communication switch in the respective transmit FIFO. However, this arrangement results in complicated logic in each transmit FIFO to assure that a continuous data flow is transmitted from a respective port. Thus, there is a need to provide a method and mechanism for enabling VLAN tag insertion/stripping/modification as well as Device ID insertion/stripping prior to writing the frame data to the transmit FIFO to avoid further complicating the logic for the transmit FIFO.

DISCLOSURE OF THE INVENTION

The invention provides a novel arrangement for VLAN tag insertion/stripping/modification and Device ID insertion/stripping of frame data read from the External memory. The apparatus includes a multiport data communication system for switching data packets between ports and comprises a plurality of receive ports for receiving data packets, a memory storing the received data packets, a plurality of transmit ports for transmitting data packets, each transmit port having a transmit queue, and a plurality of logic circuitry corresponding to the plurality of transmit ports. Each logic circuitry configured for reading data from the memory corresponding to each data packet to be transmitted from the respective transmit port, reassembling the data read from the memory, and writing the reassembled data to the corresponding transmit queue. Reassembling the data includes inserting/stripping/modifying a VLAN tag and/or inserting/stripping a Device ID into the data read from the memory prior to writing the reassembled data to the corresponding transmit queue.

The apparatus further comprises a monitoring circuit monitoring the received data packets prior to storing in the memory and determining whether a respective data packet should have the VLAN tag inserted/stripped/modified and/or the Device ID inserted/stripped. Inserting/stripping/modifying the VLAN tag and/or inserting/stripping the Device ID when reassembling the data read from memory is based on a result of the determining by the monitoring circuit.

The invention provides also a novel method of processing data packets received by a communication system having a plurality of receive ports for receiving the data packets, a memory storing the received data packets, and a plurality of transmit ports each having a transmit queue, and comprises reading data from the memory corresponding to each data packet to be transmitted from the respective transmit port, reassembling the data read from the memory, and writing the reassembled data to the corresponding transmit queue. Reassembling the data includes inserting/stripping/modifying a VLAN tag and/or inserting/stripping a Device ID into the data read from the memory prior to writing the reassembled data to the corresponding transmit queue.

The method further comprises monitoring the received data packets prior to storing in the memory and determining whether a respective data packet should have the VLAN tag inserted/stripped/modified and/or the Device ID inserted/stripped. Inserting/stripping/modifying the VLAN tag and/or inserting/stripping the Device ID in the reassembling the data read from memory is based on a result of the determining.

Various objects and features of the present invention will become more readily apparent to those skilled in the art from the following description of a specific embodiment thereof, especially when taken in conjunction with the accompanying drawings.

BRIEF DESCRIPTION OF THE DRAWINGS

FIGS. 3A, 3B, 3C are block diagrams illustrating in detail the switching subsystem of FIG. 2.

BEST MODE FOR CARRYING OUT THE INVENTION

Figure 1:
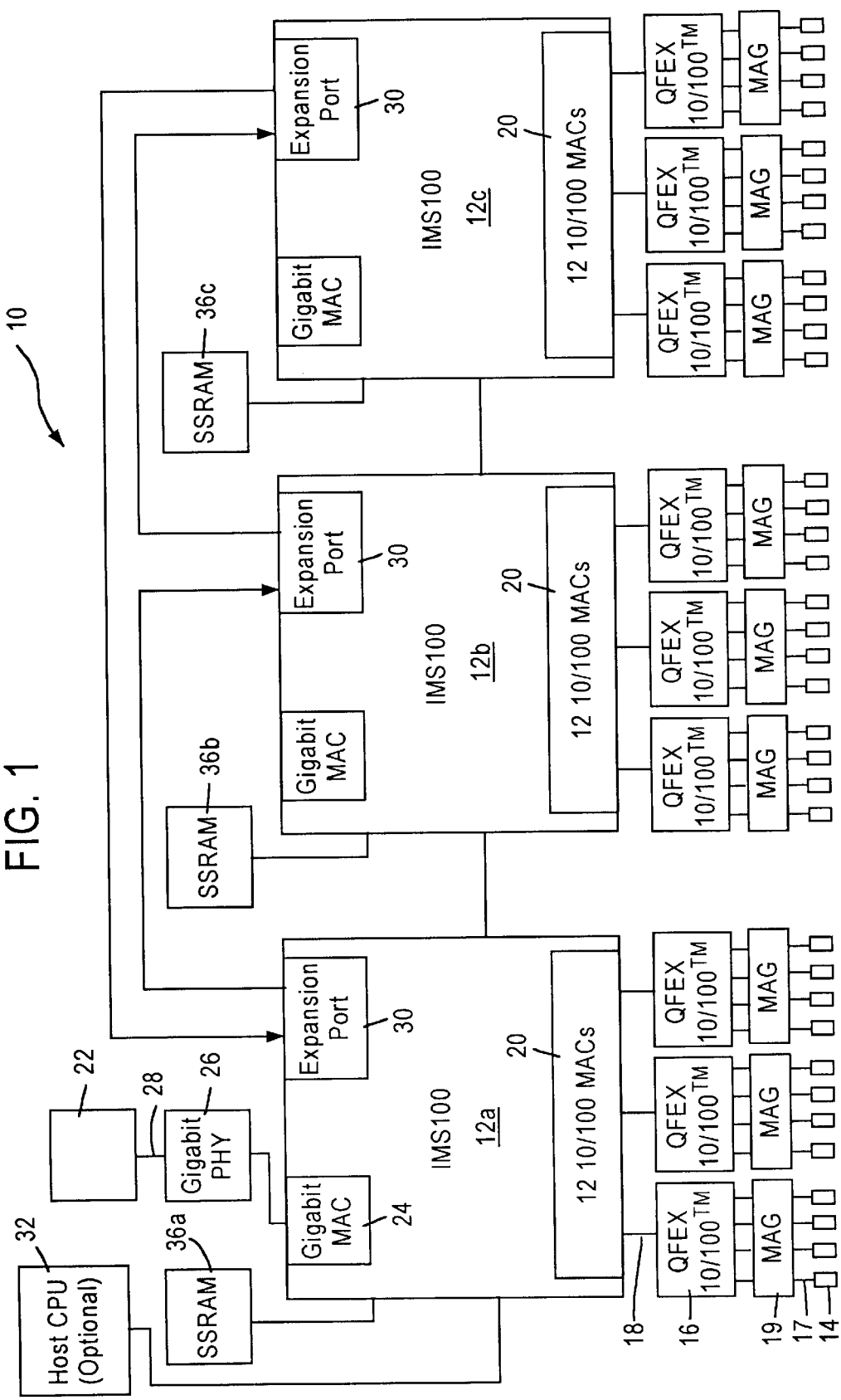
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 (12a –12c) that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing a deassertion of a receive carrier on the media. Any station 14 having data to send will attempt to access the channel by waiting a predetermined time, known as the interpacket gap interval (IPG), after the deassertion of a receive carrier on the media. If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 PHY transceivers 16 configured for sending and receiving data packets to and from the corresponding multiport switch 12 across a corresponding shared media independent interface (MII) 18. In particular, each 10/100 PHY transceiver 16 is configured for sending and receiving data packets between the multiport switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. For example, each expansion port 30 can be implemented as a second gigabit MAC port similar to the port 24, enabling multiple switches 12 to be cascaded together as a separate backbone network.

Figure 2:
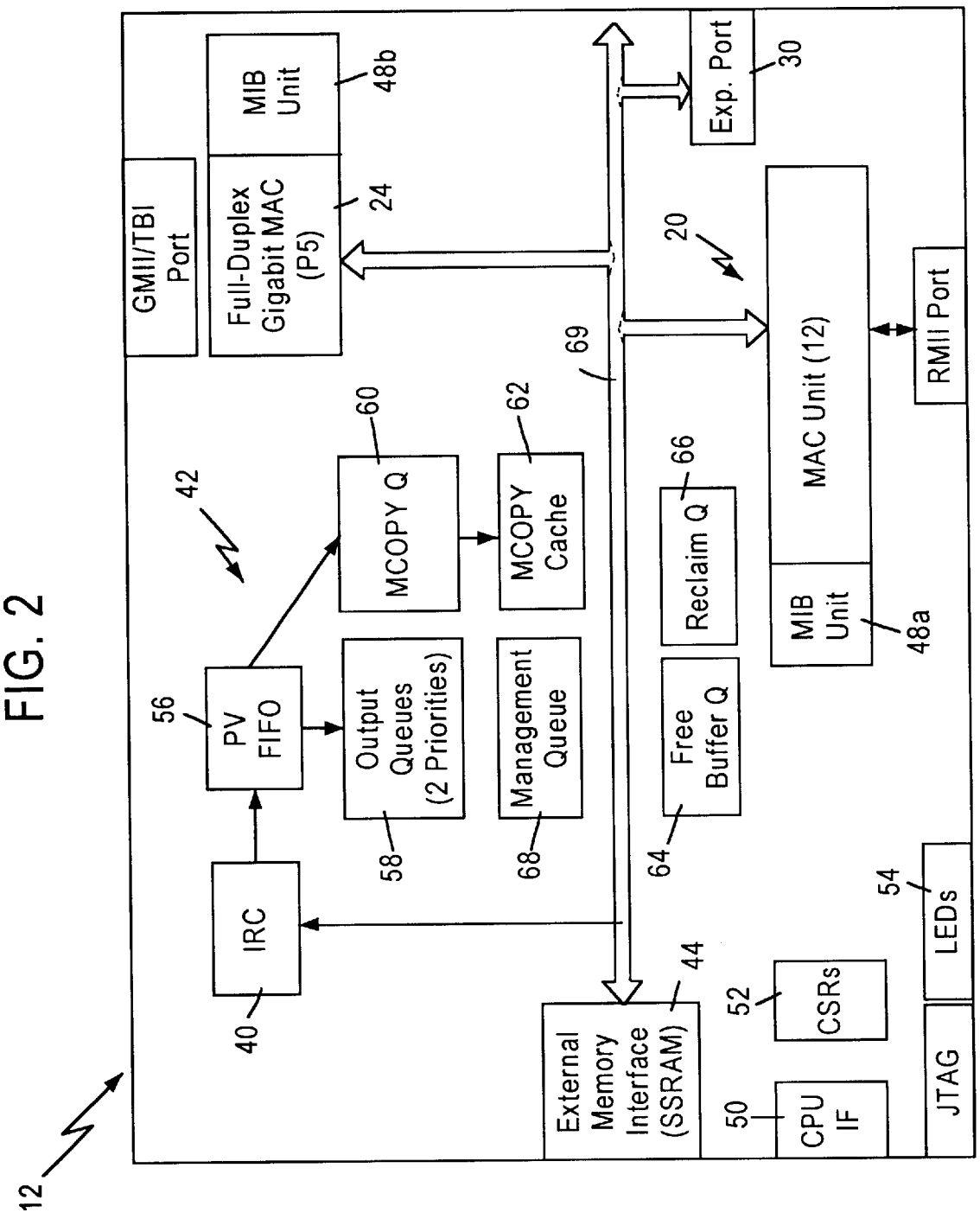
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, a buffer memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and 22. The MIB counters 48 provide statistical network information in the form of management information base (MIB) objects to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the memory 36 for storage of received frame data, memory structures, and MIB counter information. The memory 36 is preferably either a Joint Electron Device Engineering Council (JEDEC) pipelined burst or Zero Bus Turnaround™ (ZBT)-SSRAM having a 64-bit wide data path and a 17-bit wide address path. The External Memory 36 is addressable as upper and lower banks of 128K in 64-bit words. The size off the external memory 36 is preferably at least 1 Mbytes, with data transfers possible on every clock cycle through pipelining. Additionally, the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source and forwarded to at least one destination station.

The multiport switch 12 also includes an LED interface 54 that clocks out the status of conditions per port and drives external LED logic. The external LED logic drives LED display elements that are humanly readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 using the frame pointer.

The IRC 40 monitors (i.e., "snoops") the data bus to determine the frame pointer value and the header information of the received packet (including source, destination, and VLAN address information). The IRC 40 uses header information to determine which MAC ports will output the data frame stored in the external memory 36 at the location specified by the frame pointer. The decision making engine may thus determine that a given data packet should be output by either a single port, multiple ports, or all ports (i.e., broadcast). For example, each data packet includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN (virtual LAN) tag header that identifies the frame information as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should receive the data frame, Rx port number, an untagged set field, VLAN information, opcode, and frame pointer. The port vector identifies the MAC ports to receive the frame data for transmission (e.g., 10/100 MAC ports 1–12, Gigabit MAC port, and/or Expansion port). The port vector FIFO 56 decodes the forwarding descriptor including the port vector, and supplies the frame pointers to the appropriate output queues 58 that correspond to the output MAC ports to receive the data packet transmission. In other words, the port vector FIFO 56 supplies the frame pointer on a per-port basis. The output queues 58 fetch the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68 which can be processed by the host CPU 32 via the CPU interface 50.

The multicopy queue 60 and the multicopy cache 62 keep track of the number of copies of the data frame that are fetched from the respective output queues 58, ensuring that the data packet is not overwritten in the external memory 36 until the appropriate number of copies of the data packet have been output from the external memory 36. Once the number of copies corresponds to the number of ports specified in the port vector FIFO 56, the frame pointer is forwarded to the reclaim queue 66. The reclaim queue stores frame pointers that can be reclaimed by the free buffer queue 64 as free pointers. After being returned to the free buffer queue 64, the frame pointer is available for reuse by the MAC unit 20 or the gigabit MAC unit 24.

Figure 3B:
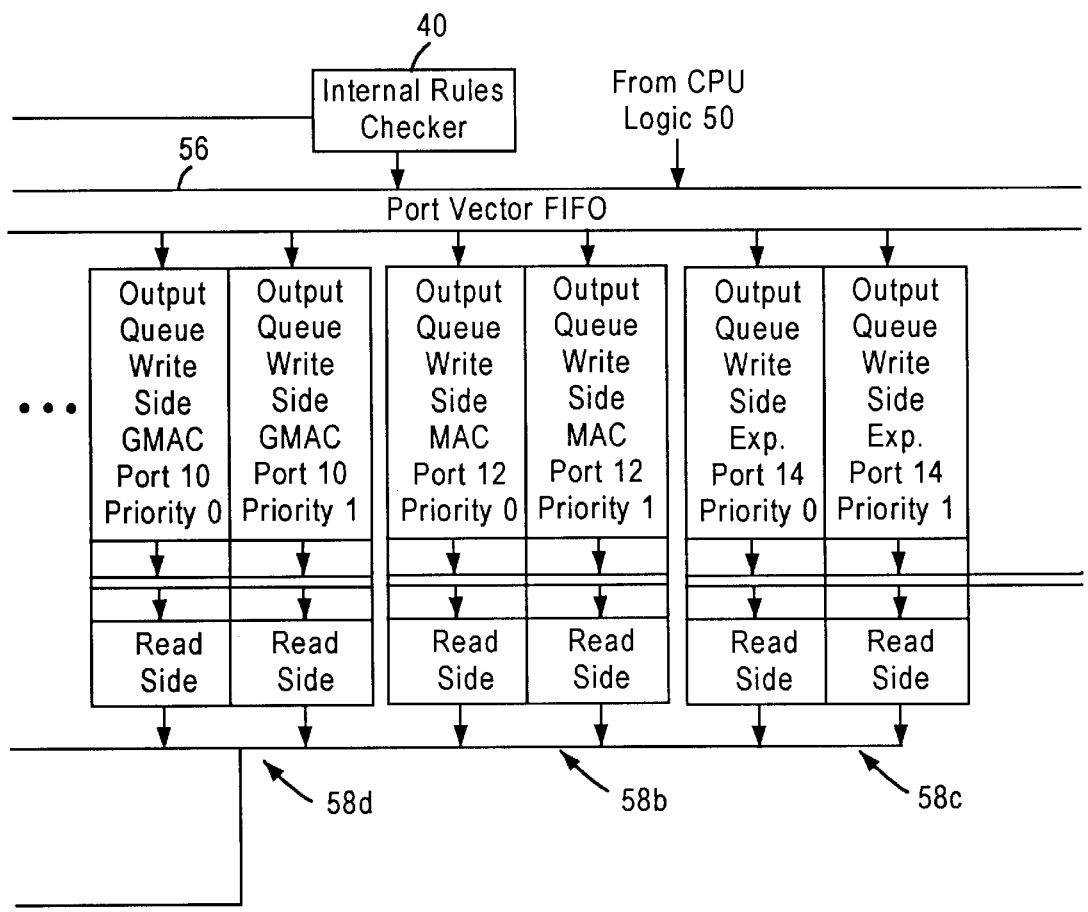
Figure 3C:
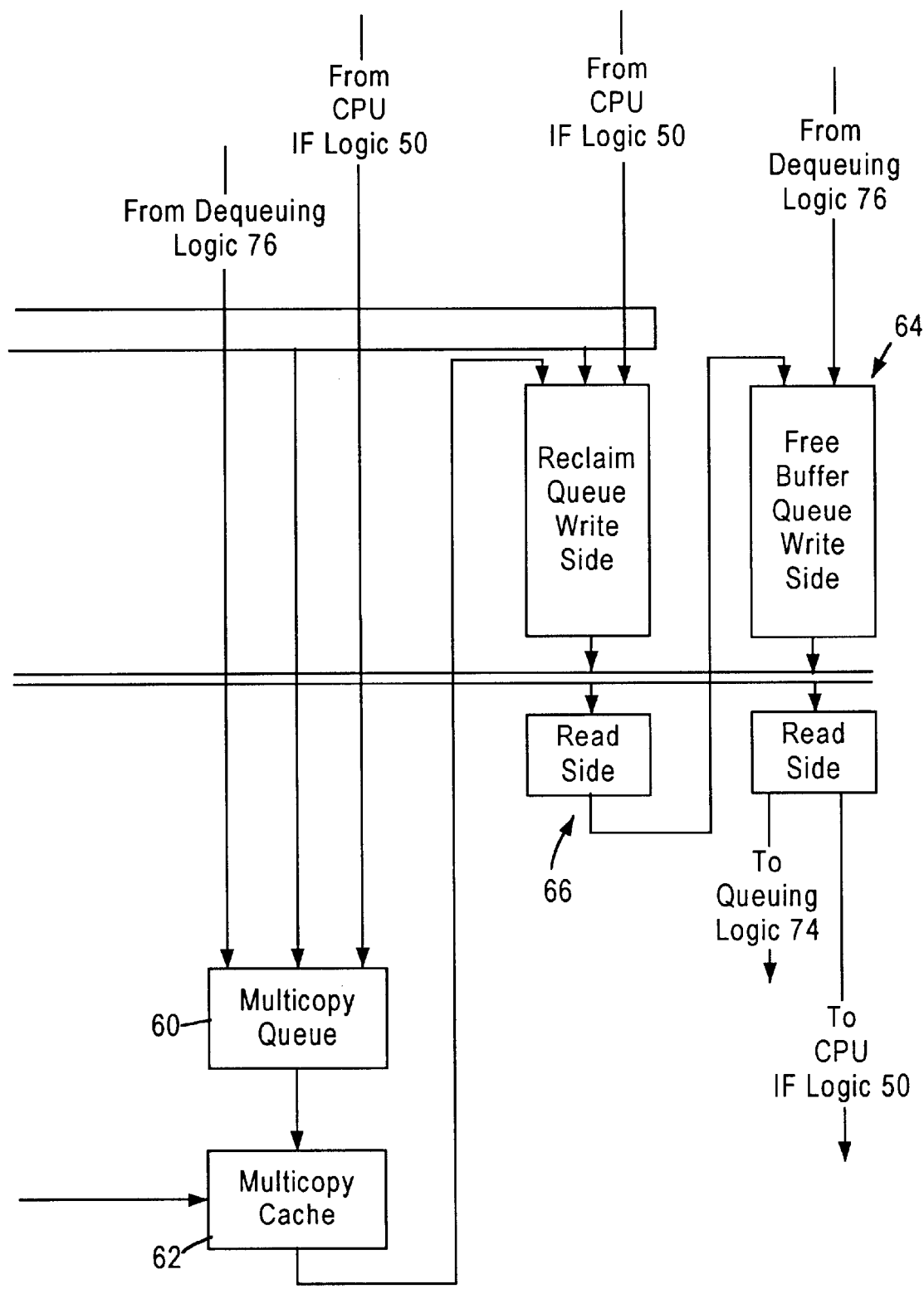

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20*a* and a transmit portion 20*b*. The receive portion 20*a* and the transmit portion 20*b* each include 12 MAC modules (only two of each shown and referenced by numerals 70*a*, 70*b*, 70*c* and 70*d*) configured for performing the corresponding receive or transmit function according to IEEE 802.3 protocol. The MAC modules 70*c* and 70*d* perform the transmit MAC operations for the 10/100 Mb/s switch ports complementary to modules 70*a* and 70*b*, respectively.

The gigabit MAC port 24 also includes a receive portion 24*a* and a transmit portion 24*b*, while the expansion port 30 similarly includes a receive portion 30*a* and a transmit portion 30*b*. The gigabit MAC port 24 and the expansion port 30 also have receive MAC modules 72*a* and 72*b* optimized for the respective ports. The transmit portions 24*b* and 30*b* of the gigabit MAC port 24 and the expansion port 30*a* also have transmit MAC modules 72*c* and 72*d*, respectively. The MAC modules are configured for fall-duplex operation on the corresponding port, and the gigabit MAC modules 72*a* and 72*c* are configured in accordance with the Gigabit Proposed Standard IEEE Draft P802.3z.

Each of the receive MAC modules 70*a*, 70*b*, 72*a*, and 72*b* include queuing logic 74 for transfer of received data from the corresponding internal receive FIFO to the external memory 36 and the rules checker 40. Each of the transmit MAC modules 70*c*, 70*d*, 72*c*, and 72*d* includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is, then transferred over a write data bus 69a from the receive FIFO to the external memory 36 in a direct memory access (DMA) transaction during the assigned slot based on the retrieved frame pointer. The frame data is stored in the location pointed to by the free buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frame pointers, and a low priority queue for low priority frame pointers. The high priority frame pointers are used for data frames that require guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

Figure 4:
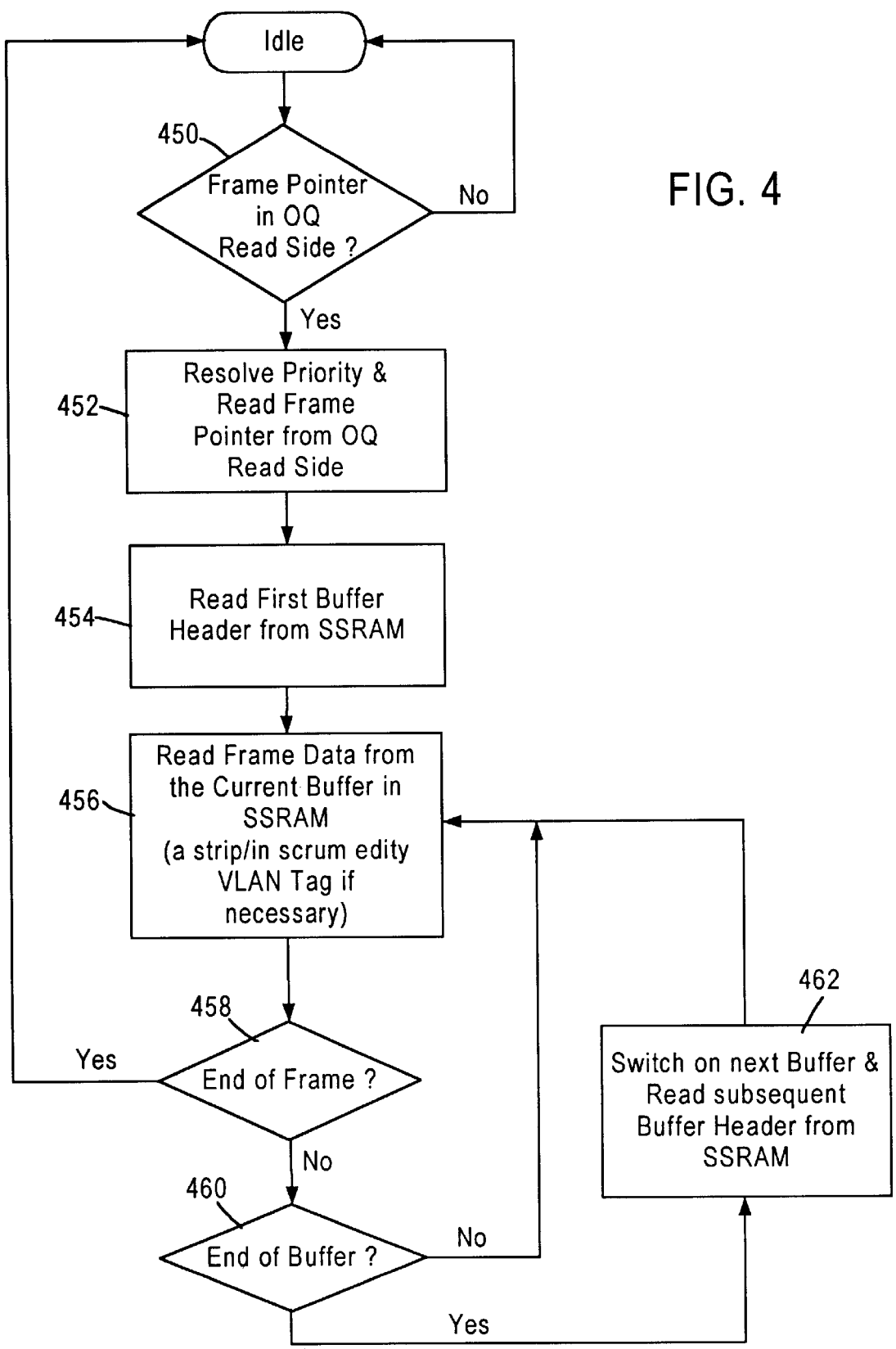
FIG. 4 is a flow diagram for a dequeuing process in accordance with embodiments of the present invention.

As noted earlier, the respective MAC dequeuing logic 76 retrieves the frame data from the external memory 36 for a particular output port. FIG. 4 is a flow diagram for the dequeuing process performed by the dequeuing logic 76. At 450, a check is first made as to whether or not a forwarding descriptor is in a read side of either the high priority queue or the low priority queue of the respective output queue. If both the high priority queue and the low priority queue have forwarding descriptors, the forwarding descriptor in the high priority queue is read (452). If only one of the queues has a frame pointer, priority does not need to be resolved and the forwarding descriptor is read. Next, the header of the first buffer in the external memory 36 pointed to by the frame pointer is read (454) and the corresponding frame data is retrieved from the external memory 36 for writing to the respective transmit FIFO (456). At this time, VLAN tag insertion/stripping/modification is performed (if directed) in accordance with the determination made earlier; e.g., by the rules checker. More specifically, at the beginning of the transfer of the frame from the external memory 36 to the transmit FIFO, the dequeuing logic 76 examines the Opcode field to determine whether VLAN tag insertion/stripping/modification should occur or the frame should pass as received. If a VLAN tag is added, four (4) bytes are added to the frame length and if a VLAN tag is stripped, four (4) bytes are subtracted from the frame length.

At 458, a determination is made as to whether or not all the data of the data frame currently being read has been read. If the EOF indication is not detected, the data reading continues with the recognition that any data frame can be made up of a plurality of buffers linked together in the external memory 36 (460 and 462). When all the data of the data frame has been read as determined at 458, the process initiates reading the data of the next data frame.

Figure 5:
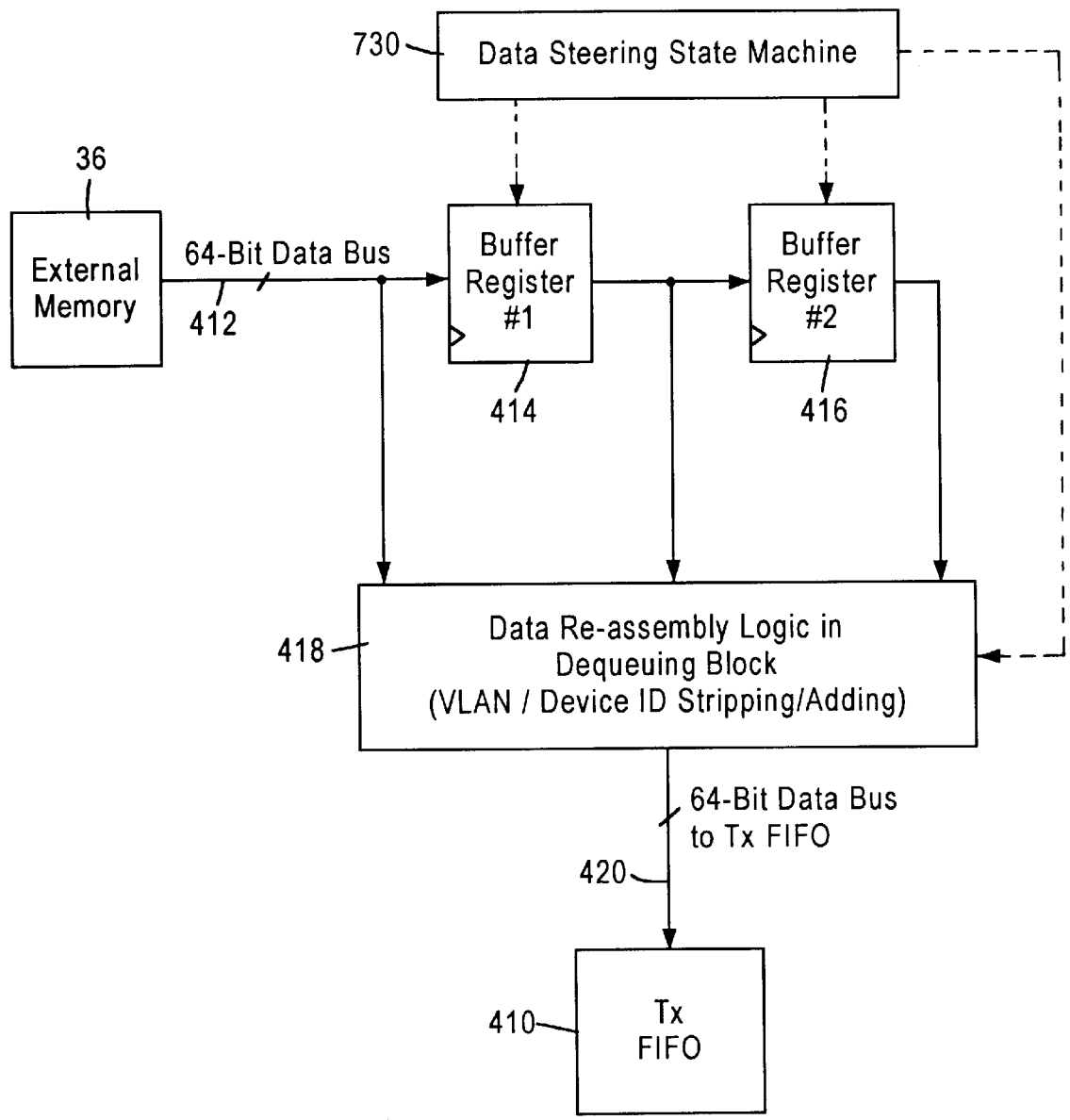
FIG. 5 is a diagram showing an exemplary data path from the external memory to a transmit FIFO in accordance with certain embodiments of the present invention.

FIG. 5 shows a data path from the external memory 36 to the transmit FIFO 410 for a respective port. In a first read operation, i.e., a first slot (time), 8 bytes of frame data are read from the external memory 36 and transmitted on a 64-bit data bus 412 (8×8=64 bits) to the first buffer register 414. In a second read operation, the frame data in the first buffer register 414 are transferred to the second buffer register 416 (freeing up the first buffer 414) as well as to the data re-assembly logic 418, and the next 8 bytes of frame data are read from the external memory 36 and transmitted on 64-bit data bus 412 to the first buffer register 414. Therefore, at the end of two time slots, both the first and second buffer 414, 416 have been filled. Since the data re-assembly logic 418 need 192 bits of data to begin reassembly, in a third read operation, the data in the second buffer 416 are transferred to the data re-assembly logic 418 (64 bits), the data in the first buffer register 414 are transferred to the second buffer register 416 as well as to the data re-assembly logic 418 (64 bits), and the next 8 bytes (64 bits) of frame data are read from the external memory 36 and transmitted on 64-bit data bus 412 to both the data reassembly logic 418 and the first buffer register 414. Operational control for the first buffer register 414, the second buffer register 416 and the data re-assembly logic 418 during these read operations is provided by data steering state machine 730. The data in the re-assembly logic 418 is either passed to the transmit FIFO as is or has a VLAN tag inserted/stripped/modified and/or a Device ID inserted/stripped in accordance with the determination made earlier by the IRC 40. Also during the third read operation, data steering state machine 730 controls the data re-assembly logic 418 to begin the transfer of 8 bytes of reassembled data to the transmit FIFO 410.

Figure 6:
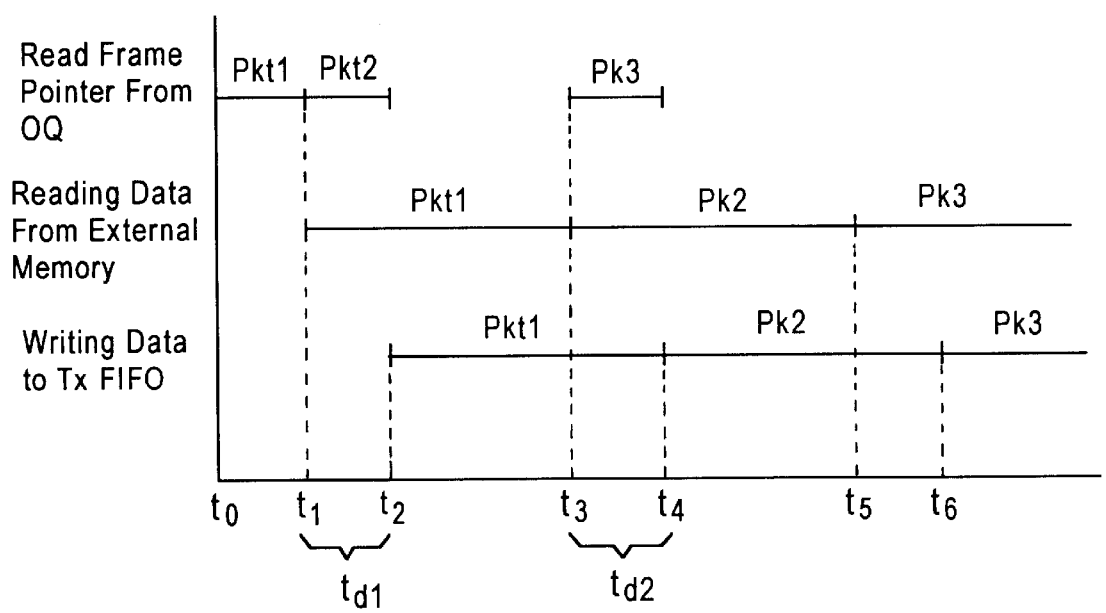
FIG. 6 is a diagram showing pipeline timing for the reading and writing operations for the dequeuing process according to the present invention.

FIG. 6 is a timing diagram showing pipeline timing for the reading and writing operations in the dequeuing process. At time t0, reading of the frame pointer (part of the forwarding descriptor) for the first frame data or packet (Pkt 1) begins and is completed at time t1 at which time reading of the frame pointer for the second packet (Pkt 2) begins. Also at time t1, reading of the data from the external memory 36 corresponding to the first packet begins. At time t2, writing of the data corresponding to the first packet to the respective transmit FIFO 410 begins. At time t3, reading of the data corresponding to the first packet from the external memory 36 is completed and reading of the data corresponding to the second packet beings. Reading of the frame pointer for a third packet begins at time t3 also. At time t4, writing of the data corresponding to the first packet to the respective transmit FIFO 410, and writing of the data corresponding to the second packet to the respective transmit FIFO 410 begins. At time t5, reading of the data corresponding to the second packet from the external memory 36 is completed and reading of the data corresponding to the third packet beings. At time t6, writing of the data corresponding to the second packet to the respective transmit FIFO 410 is completed and writing of the data corresponding to the third packet to the transmit respective FIFO 410 begins. Reading and writing of data for the remaining packets proceeds in a similar pipelined manner.

Since a constant stream of data to the transmit FIFO 410 is to be maintained, writing of frame data to the transmit FIFO 410 begins after the first and second buffers (414, 416) are filled. Therefore, there is a time delay ($t_{d1}$) between beginning reading data of the first packet from the external memory 36 and beginning writing the read data of the first packet to the transmit FIFO 410. It is during this time delay ($t_{d1}$) that the data re-assembly logic 418 can carry out VLAN tag insertion/stripping/modification and Device ID insertion/stripping for the first packet if necessary. There is also a time delay ($t_{d2}$) between beginning reading data of the second packet from the external memory 36 and beginning writing the read data of the second packet to the transmit FIFO 410 allowing the VLAN tag insertion/stripping/modification and Device ID insertion/stripping for the second packet to occur if necessary.

Figure 7:
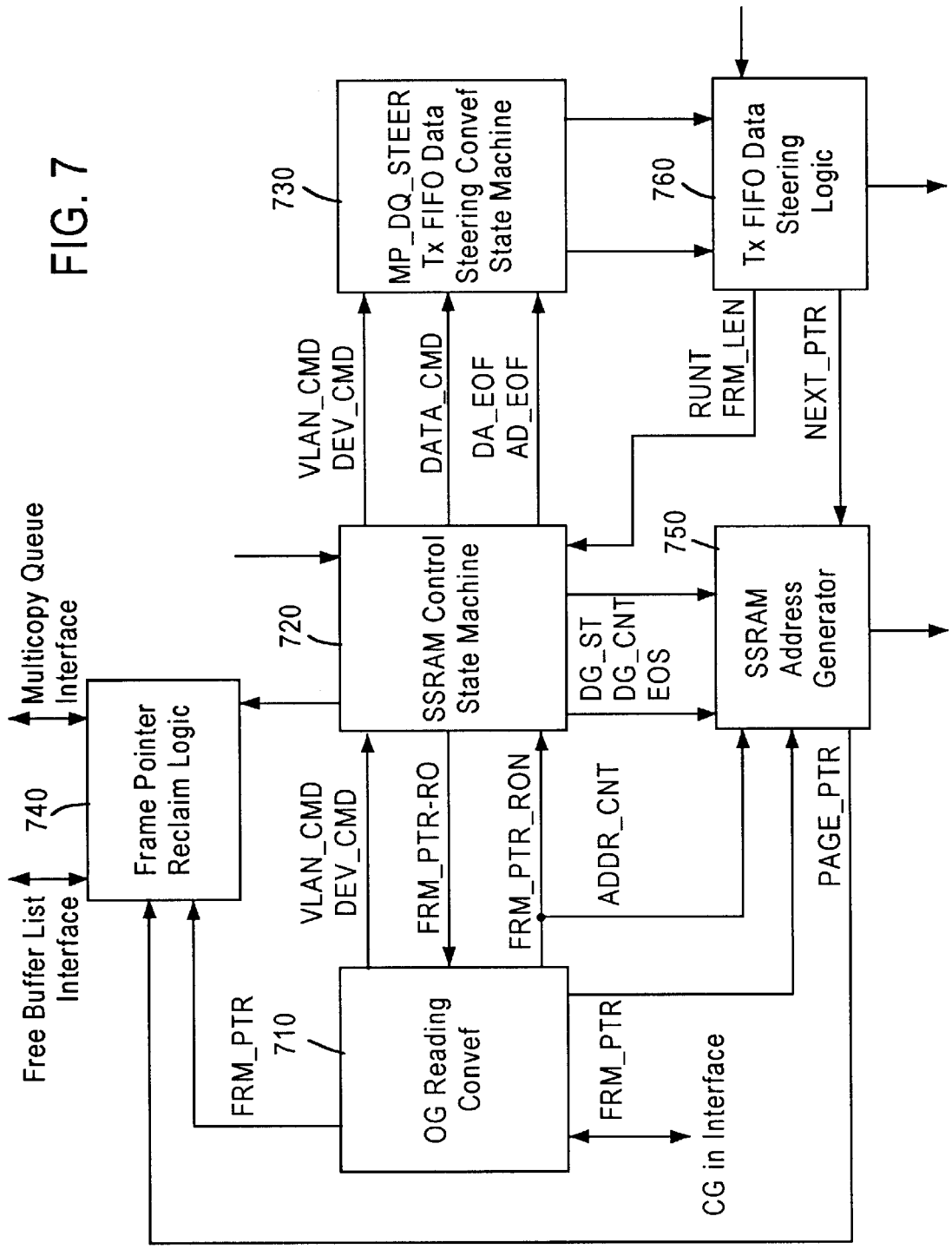
FIG. 7 is a diagram illustrating an exemplary embodiment of the architecture for the dequeuing process of the present invention.

Referring to FIG. 7, the architecture for the dequeuing process is explained. Block 710 is an Output Queue Reading Control. This block controls reading of the frame pointer from the output queue 58, passing of the read frame pointer to the SSRAM Control State Machine 720, and capturing of the Opcode and VLAN ID (VLAN_CMD, DEV_CMD) for the Tx FIFO Data Steering Logic 760. SSRAM Control State Machine 720 sequences the dequeuing of frame data from the linked list of buffers in the external 36 and generates command DATA_CMD to Tx FIFO Data Steering Control State Machine 730.

Figure 8:
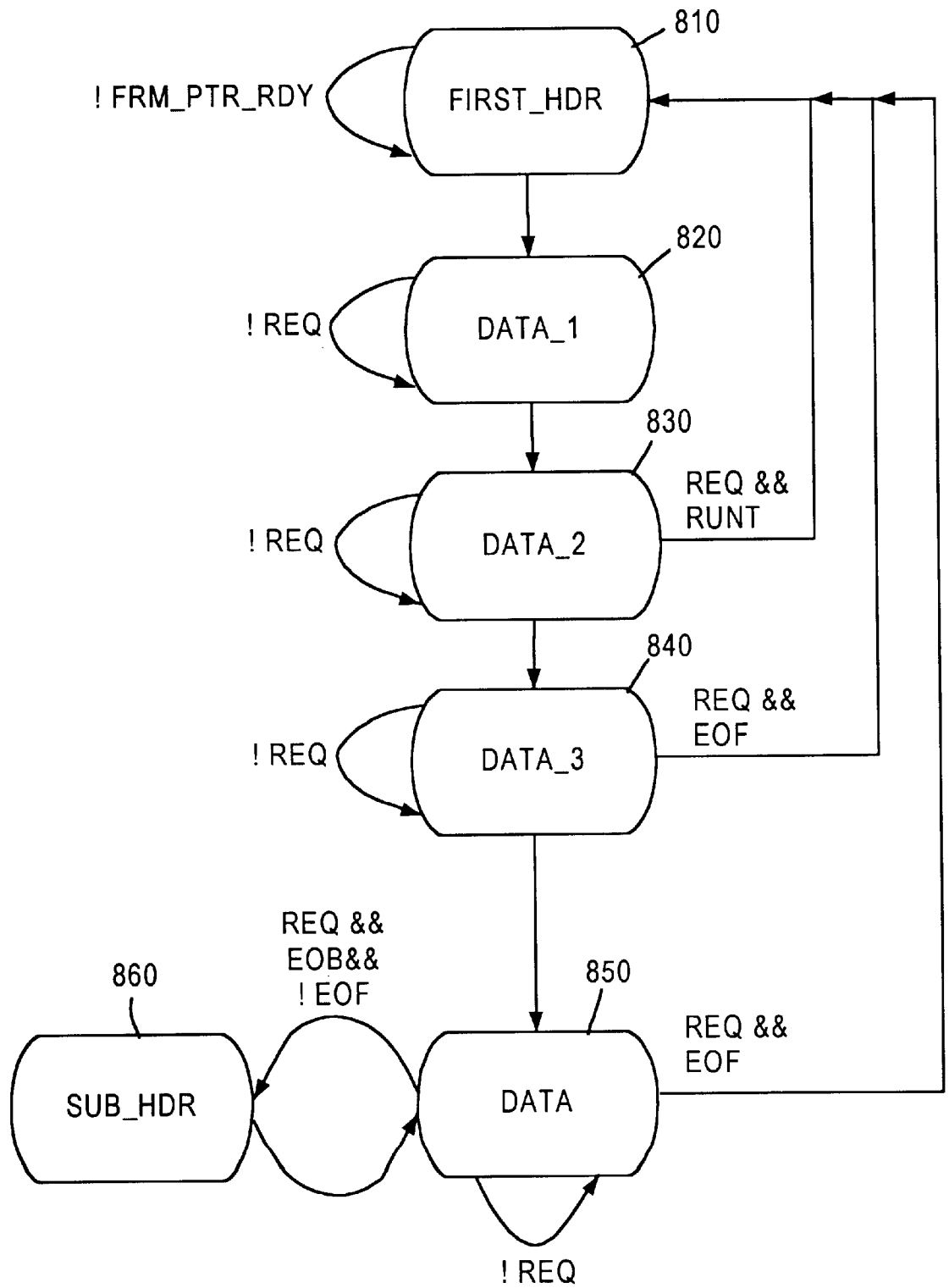
FIG. 8 is an exemplary state diagram for the SSRAM Control State Machine of FIG. 7.

FIG. 8 is a state diagram for the SSRAM Control State Machine 720. At 810, the state is "ready to read the header for the first buffer" while the condition from OQ (Output Queue) Reading Control 710 is! FRM_PTR_RDY. After reading the first header for the first buffer, the state 820 is "ready to read the first data of the first buffer from the SSRAM". Subsequent states (830, 840, 850) are "ready to read the second, third and subsequent data of the first buffer from the SSRAM". After reading the second data of the first buffer, if the frame data is shorter than a regular Ethernet packet (64 bytes), a RUNT signal is detected acting as an end of frame (EOF) signal. If the frame data is not shorter than a regular Ethernet packet, data continues to be read until an EOF signal is detected. However, as each buffer in the external memory 36 is 256 bytes and a frame can be greater than 256 bytes (linked buffers), when the end of the current buffer (EOB) is detected, the state becomes "ready to read the header for the next buffer" (SUB_HDR) 860 and the subsequent state is "ready to read the data of the next buffer" (850). The states 850 and 860 continue to be repeated (linked buffers) until the EOF signal is detected. In FIG. 8, an "!" before a signal indicates the inverse condition.

Referring again to FIG. 7, block 730 is the Tx FIFO Data Steering Control State Machine. This block sequences writing of data to the transmit FIFO 410, performs data re-assembly including VLAN tag insertion/stripping/modification and/or Device ID insertion/stripping if necessary, and receives a command from the SSRAM Control State Machine 720. As noted earlier, each multiport switch 12 also includes an expansion port 30 for transferring data between other switches. When each expansion port 30 is implemented as another gigabit MAC port enabling multiple switches to be cascaded together as a separate backbone network, a Device ID tag is inserted that identifies the other expansion port and four (4) bytes are added to the frame length as in the case for adding a VLAN tag. Similarly, if there is a Device ID tag which must be stripped, four (4) bytes are subtracted from the frame length as in the case for stripping a VLAN tag. Such adding and subtracting of bytes results in data re-assembly for Device ID similar to data re-assembly for VLAN tag.

Figure 9:
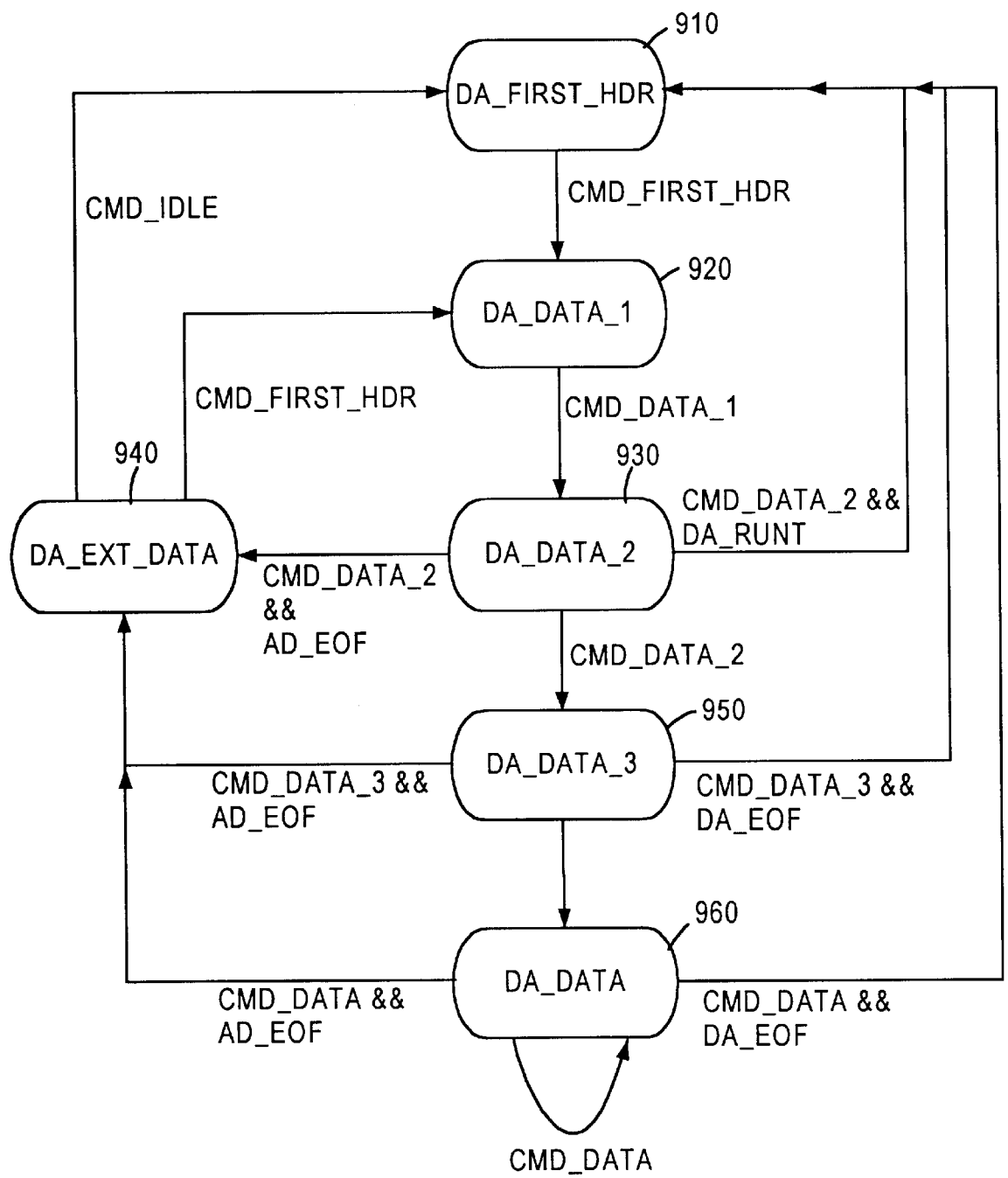
FIG. 9 is an exemplary state diagram for the Tx FIFO Data Steering Control State Machine of FIG. 7.

FIG. 9 is a state diagram for the transmit FIFO Data Steering Control State Machine 730. Reference numeral 910 denotes the state "ready to write the first header is ready to the transmit FIFO" and the condition received from the SSRAM Control State Machine 720 is CMD_FIRST_HDR which is part of DATA_CMD (FIG. 7). 920 denotes the state "ready to write the first burst of data to the transmit FIFO" and the condition received from the SSRAM Control State Machine is CMD_DATA_1. 930 denotes the state "ready to write the second burst of data to the transmit FIFO" and the condition received from the SSRAM Control State Machine is CMD_DATA_2. At this time, if the second burst of data is also the end of the frame (runt frame), DA_RUNT will be detected and the state returns to DA_FIRST_HDR. In addition, AD_EOF indicates the state "last burst of data to be read from the SSRAM" and 940 indicates the state "another time slot needs to be created to write this last data to the transmit FIFO". After reading the last burst of data from the external memory 36, one of two conditions can be received from the SSRAM Control State Machine. The first condition is CMD_IDLE indicating that there is no reading from the external memory 36 and the state returns to "ready to write the header of the next frame to the transmit FIFO" (DA_FIRST_HDR). The second condition is CMD_FIRST_HDR indicating that the header for the next frame has previously been fetched and the state returns to "ready to write the first burst of data to the transmit FIFO". If the second burst of data is not the end of frame, 950 denotes the state "ready to write the third burst of data to the transmit FIFO" and the condition received from the SSRAM Control State Machine 720 is CMD_DATA_3. The subsequent states of the Tx FIFO Data Steering Control State Machine 730 (950, 960) are similar to that described and are dependent on whether or not the current burst of data is also the end of the frame.

Referring again to FIG. 7, Block 750 is the SSRAM Address Generator. This block generates addresses for reading frame data from the SSRAM based on command DQ_ST and ADDR_CNT from the SSRAM Control State Machine 720, FRM_PTR from OQ Reading Control 710, and NEXT_PTR from Tx FIFO Data Steering Logic 760. The Tx FIFO Data Steering Logic 760 provides control of the SSRAM data path and constructs the buffer header, performs VLAN tag insertion/stripping/modification and Device ID insertion/stripping based on the command from the op-code and the Tx FIFO Data Steering Control State Machine 730. Finally, block 740 is the Frame Pointer Reclaim Logic which returns the pointer at the end of each buffer for a unicopy frame (PAGE_PTR), and returns the frame pointer at the end of each packet for a multicopy frame (FRM_PTR).

Each of the state machines and control logic blocks depicted in FIG. 7 are readily implemented by one of ordinary skill in the art provided the functional description above.

The present invention provides a method and mechanism is provided for performing VLAN tag insertion/stripping/modification as well as Device ID insertion/stripping in the dequeuing logic prior to writing the frame data to the transmit FIFO. By performing tasks prior to writing the frame data to the transmit FIFO, more complicated logic for the transmit FIFO is avoided.

In this disclosure, there are shown and described only the preferred embodiments of the invention, but it is to be understood that the invention is capable of changes and modifications within the scope of the inventive concept as expressed herein.

What is claimed is:

1. A multiport data communication system for switching data packets between ports, the data communication system comprising:

a plurality of ports for receiving and transmitting data packets, each transmit port having a transmit queue;

a memory storing received data packets;

a plurality of queues, each corresponding to a respective port and storing frame pointers that point to where the data packets are stored in the memory; and a plurality of logic circuitry corresponding to the plurality of transmit ports and each logic circuitry configured for reading respective frame pointers from the plurality of queues, reading from the memory the respective data packets corresponding to the respective frame pointers, reassembling the data read from the memory including performing inserting or modifying a virtual local area network (VLAN) tag, and performing inserting or stripping a Device ID into the data read from the memory, and writing the reassembled data to the corresponding transmit queue.

2. The system of claim 1, wherein reassembling the data read from the memory further includes performing stripping a VLAN tag where necessary.

3. The system of claim 2, further comprising:

circuitry configured to retrieve the plurality of received data packets from each port; and circuitry configured to monitor the retrieved data packets prior to storing in the memory and determine whether a respective data packet should have the VLAN tag inserted, stripped or modified, and/or whether the Device ID should be inserted or stripped, wherein inserting, stripping or modifying the VLAN tag, and inserting or stripping the Device ID in said reassembling the data read from memory is based on a result of said determining by said monitor circuitry.

4. The system of claim 2, wherein each logic circuitry comprises:

a first buffer connected to the memory and coupled to the corresponding transmit queue;

a second buffer connected to a corresponding first buffer memory and the corresponding transmit queue; and a data reassembly logic connected to the memory, the corresponding first and second buffers, and the corresponding transmit queue and configured for reassembling the data to be transferred to the corresponding transmit queue in accordance with the determination made by the monitoring circuit as to whether a respective data packet should have the VLAN tag inserted, stripped or modified, and whether the Device ID should be inserted or stripped.

5. The system of claim 4, wherein said each logic circuitry is further configured to read data from the memory to the corresponding data reassembly logic and first buffer, and then transfer from the corresponding first buffer to the corresponding data reassembly logic and second buffer, transfer the data in the second buffer also to the corresponding data reassembly logic, and transfer the data in the corresponding data reassembly logic to the corresponding transmit queue.

6. The system of claim 2, wherein each logic circuitry comprises:

a reading control for controlling reading of frame pointers from the corresponding queue;

a memory control receiving read frame pointers from the reading control, controlling reading from the memory the respective data packets corresponding to received frame pointers, and generating a command signal; and a steering control receiving the command signal from the memory, sequencing writing of each read data packet to the corresponding transmit queue and performing inserting, stripping or modifying a virtual local area network (VLAN) tag, and performing inserting or stripping a Device ID into the data read from the memory.

7. A method in a communication system for storing and retrieving received data packets for transmission from at least one of a plurality of ports comprising:

receiving data packets via a plurality of ports;

storing the received data packets in a memory;

storing frame pointers that point to where the data packets are stored in the memory;

reading respective frame pointers;

reading from memory the respective data packets corresponding to the respective frame pointers;

reassembling the data read from the memory including performing inserting or modifying a virtual local area network (VLAN) tag, and performing inserting or stripping a Device ID into the data read from the memory; and writing the reassembled data to a transmit queue corresponding to a respective port.

8. The system of claim 7, wherein reassembling the data read from the memory further includes performing stripping a VLAN tag where necessary.

9. The method according to claim 8, further comprising:

monitoring the data packets prior to storing in the memory; and determining whether a respective data packet should have the VLAN tag inserted, stripped or modified, and whether the Device ID should be inserted or stripped, wherein inserting, stripping or modifying the VLAN tag, and inserting or stripping the Device ID in said reassembling the data read from memory being based on a result of said determining.

10. In a communication system having a plurality of ports for receiving and transmitting data packets, memory storing the received data packets, a plurality of queues, each corresponding to a respective port and storing frame pointers that point to where the data packets are stored in the memory, and a plurality of logic circuitry corresponding to the plurality of ports, a method of processing a data packet for transfer from the memory to a transmit queue comprising:

reading respective frame pointers from the plurality of queues;

reading from memory the respective data packets corresponding to the respective frame pointers;

reassembling the data read from the memory including performing inserting or modifying a virtual local area network (VLAN) tag, and performing inserting or stripping a Device ID into the data read from the memory; and writing the reassembled data to the corresponding transmit queue.

11. The system of claim 10, wherein reassembling the data read from the memory further includes performing stripping a VLAN tag where necessary.

12. The method according to claim 11, further comprising:

monitoring the data packets prior to storing in the memory; and determining whether a respective data packet should have the VLAN tag inserted, stripped or modified, and whether the Device ID should be inserted or stripped.

13. In a communication system having a plurality of ports for receiving and transmitting data packets, memory storing the received data packets, a plurality of queues, each corresponding to a respective port and storing frame pointers that point to where the data packets are stored in the memory, a plurality of first buffers corresponding to the plurality of ports, a plurality of second buffers corresponding to the plurality of transmit ports, and a plurality of data reassembly logic corresponding to the plurality of ports, a method of processing a data packet for transfer from the memory to a transmit queue comprising:

reading respective frame pointers from the plurality of queues;

reading from memory the respective data packets corresponding to the respective frame pointers to a corresponding data reassembly logic and a corresponding first buffer;

transferring the data from the corresponding first buffer to the corresponding data reassembly logic and a corresponding second buffer while reading next data from the memory to the corresponding data reassembly logic and the corresponding first buffer;

transferring data in the corresponding second buffer to the corresponding data reassembly logic while transferring the data from the corresponding first buffer to the corresponding data reassembly logic and the corresponding second buffer and reading next data from the memory to the corresponding data reassembly logic and the corresponding first buffer;

reassembling the data in the corresponding data reassembly logic including performing inserting or modifying a virtual local area network (VLAN) tag, and performing inserting or stripping a Device ID into the data read from the memory; and transferring reassembled data in the corresponding data reassembly logic to the corresponding transmit queue.

14. The system of claim 13, wherein reassembling the data read from the memory further includes performing stripping a VLAN tag where necessary.

15. The method according to claim 14, further comprising:

monitoring the data packets prior to storing in the memory; and determining whether a respective data packet should have the VLAN tag inserted, stripped or modified, and whether the Device ID should be inserted or stripped.

* * * * *